Patented June 4, 1940

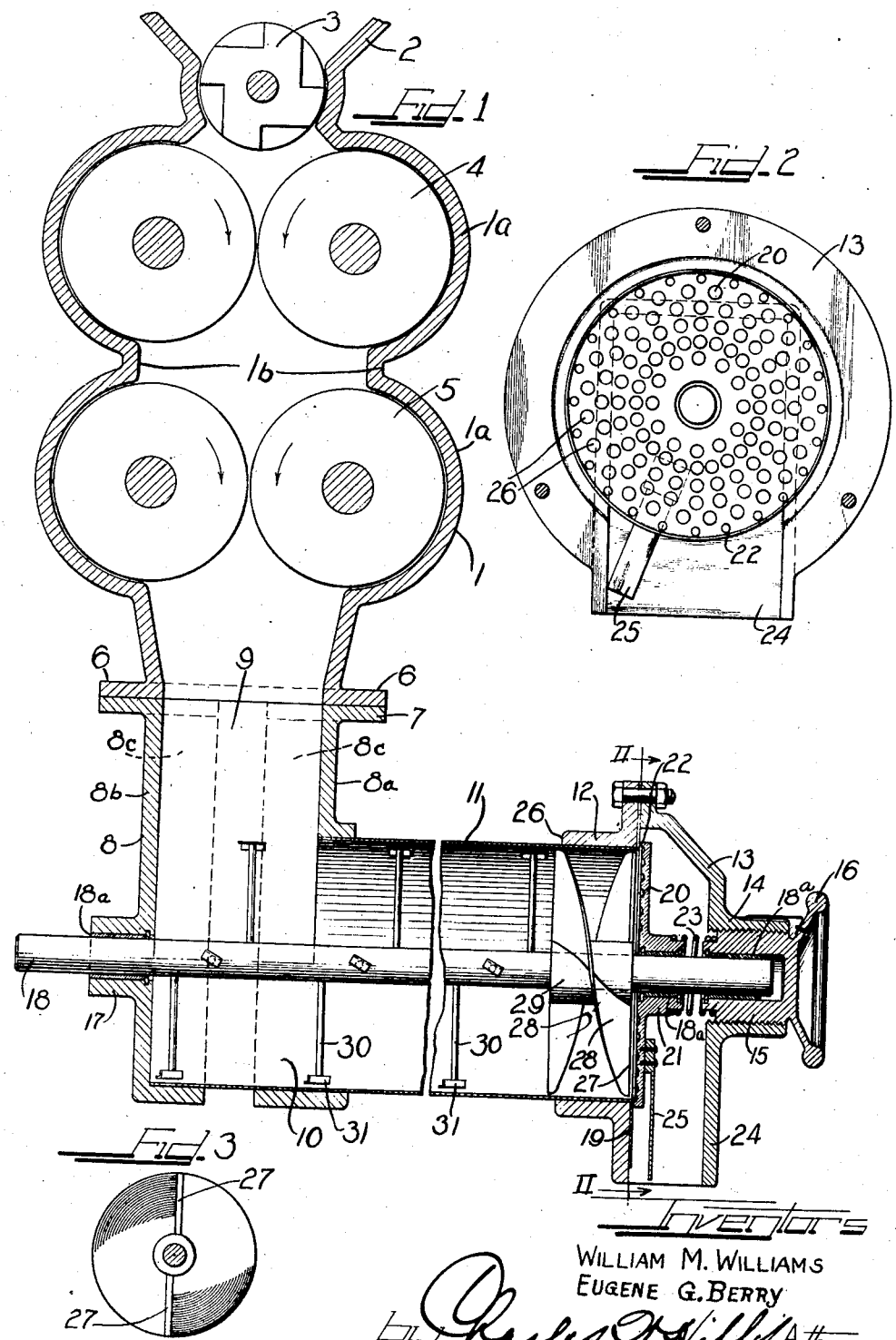

2,202,936

UNITED STATES PATENT OFFICE 2,202,936

APPARATUS FOR TREATING GRANULATED COFFEE

William M. Williams and Eugene G. Berry, Chicago, Ill., assignors to B. F. Gump Co., Chicago, Ill., a corporation of Illinois Application March 20, 1937, Serial No. 132,014

2 Claims. (Cl. 83—18)

This invention relates to an apparatus for treating granulated coffee.

The invention concerns itself with a novel apparatus for treating granulated coffee so as to comminute and conceal the chaff that can be adapted for the retail trade as well as the wholesale trade.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Figure 1 is a sectional view through a coffee mill involving this invention.

Figure 2 is an elevational view of one of the chaff reducing elements taken upon the line II—II of Figure 1 looking in the direction of the arrows.

Figure 3 is an end elevational view of a rotary chaff reducing element.

In accordance with this invention, the coffee beans are first cracked. The cracking process liberates the chaff in fairly large flakes. The cracked coffee with its liberated chaff is then granulated to the desired degree of fineness. The product consisting of the granulated coffee and liberated chaff is subjected to a rubbing action that comminutes the chaff and renders the same substantially invisible.

The apparatus exemplifying this invention consists of a casing 1 which is formed at its upper end with a hopper portion 2 in the throat of which a feeding device 3 is suitably journalled. Below the feeding device there is a pair of cracking rolls 4 which cooperate to crack the coffee beans and liberate the chaff. Below the cracking rolls 4 there is a pair of cooperating granulating rolls 5 that reduce the coffee beans to the desired state of fineness. It will be noted that the casing has arcuate portions 1a to receive the rolls and that the arcuate portions merge between the cracking and granulating rolls as indicated at 1b.

The casing 1 is flanged at its lower end as indicated at 6 and this flanged portion is seated upon the flange 7 of a composite casing 8. The casing 8 consists of two members 8a and 8b having end walls 8c spaced apart with steel plates 9 welded or secured to the end walls.

The lower portion of the composite casing 8 is cylindrical as indicated at 10 for the reception of one end portion of a steel cylinder 11. The lower portion of the cylinder 11 extends to the end wall of the casing member 8b while the upper portion terminates at the inner edge of the side wall of the member 8a. The upper portion of the cylinder is cut away about one-half way down. The lower portions of the casing 1 and the upper portion of the casing 8 form a suitable passage through which the granulated coffee and liberated chaff drop into the cylinder 11.

A flanged bearing ring 12 surrounds the rear end of the cylinder 11. A bearing bracket 13 is secured to the ring 12 and extends outwardly and downwardly in spaced relation to the rear end of the cylinder 11. The bracket 13 has an intermediate bearing boss 14 into which is adjustably threaded a shaft bearing 15 provided at its outer end with a hand wheel 16. The casing member 8b is provided with a bearing boss 17 and a shaft 18 that extends centrally through the cylinder is journalled in the bearing boss 17 and the shaft bearing 15. A bushing 18a is preferably used in the bearing 15 and the boss 17. The bushing 18a in the bearing 15 is preferably shorter than the cylindrical cavity therein and the end of the shaft is spaced from the inner end of the cavity to allow for suitable adjustment of the bearing 15 for a purpose that will later appear.

A smooth and flat steel ring 19 is secured to the outstanding flange of the bearing ring 12 and surrounds the end of the cylinder 11 in flush relation therewith.

A disk 20 having a hub 21 through which the shaft 18 freely passes tends to close the rear end of the cylinder 11 and bears against the ring 19. The outer edge of the disk 20 has a small rim, bead or flange 22 that bears against the flat ring 19 to prevent flakes of chaff from escaping. The hub 21 and the bearing 15 are reduced at their confronting ends for supporting a coil spring 23 therebetween. This coil spring 23 yieldingly urges the disk 20 against the flat ring 19. By adjusting the bearing 15, the tension of the spring 23 can be varied.

The aforementioned bearing bracket 13 which is substantially circular in form as shown in Figure 2 has a channel shaped portion 24 at its lower end below the rim of disk 22. This channel shaped portion cooperates with the ring 12 for forming a discharge chute for the finished coffee product. A tongue or lever 25 is secured to the lower portion of the disk 20 in the channel shaped portion 24, and is adapted to engage one side of the chute to prevent rotation of the disk 20. The tongue 25 merely constitutes a means for preventing rotation of the disk 20 but allowing outward movement thereof.

The inner face of the disk 20 is preferably provided with numerous small depressions 26 into which the coffee particles are adapted to lodge. The surface might be said to be knurled for impeding rotation of the mass of coffee thereagainst. Cooperating with this knurled surface are the ends 27 of spirals 28 which are integral with a sleeve 29 secured upon the shaft 18. The spirals 28 form what is termed a double spiral, which extends only a short distance from the plate 20. On the remainder of the shaft are secured fingers or pins 30 in staggered relation. Upon the ends of the fingers are small cross pieces 31 which are preferably arranged at an angle to a longitudinal plane. These fingers are primarily designed to assist in conveying the material forwardly.

It will, of course, be understood that suitable driving mechanism will be supplied for simultaneously driving the different parts including the mixing and comminuting shaft 18. This mechanism has not been illustrated as any mechanic can readily apply the same.

In the operation of the machine, the granulated coffee and its liberated chaff fall by gravity into the forward end of the mixing chamber formed by the cylinder 11. The material is then conveyed to the rear end thereof against the knurled face of the disk 20 where its rotation is impeded by the knurled surface, where an accumulation will occur. It will be noted that the ends 27 of the spirals are slightly spaced from the knurled face when the disk 20 is pressed tight against the ring plate 19. Consequently, the rotation of the spirals will produce a rubbing action upon the coffee between its ends 27 and the knurled face that will reduce or comminute the chaff so that it is substantially hidden in the product.

It will be appreciated that the particles of coffee in contact with the knurled face will be retarded in their movements as the ends 27 of the spirals rotate, while the particles of coffee adjacent the ends 27 of the spirals will not be thuswise retarded. There is, hence, an appreciable relative movement between the particles under pressure to produce a sufficient rubbing action to accomplish the result sought.

As the pressure against the disk 20 increases, it will slide slightly upon the shaft 18 against the pressure of the spring 23 and allow the finished product to escape between it and the end of the cylinder. The material as it thuswise escapes will fall through the spout formed by the channel 24.

It will be appreciated that it is possible to incorporate this invention in any size of machine. It is possible to incorporate it in a small machine to handle small quantities of coffee for the retail trade which is demanding steel cut coffee that can only be produced in roller mills. It will be evident that the invention is simple yet very efficacious for the purpose intended.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. In apparatus of the character described having means for reducing coffee beans to a mass containing coffee particles and particles of liberated chaff, a cylindrical chamber for receiving the coffee mass, a yieldable disc closing one end of said chamber, a rotatable screw conveyor in said chamber for moving the mass against said disc, the end of said conveyor adjacent the disc being normally spaced therefrom sufficiently to prevent grinding of the coffee particles, and said disc being substantially flat to cooperate with the adjacent end of the conveyor and having a plurality of small depressions for restraining the adjacent coffee particles in the mass portion pressing against the disc from relative movement with the conveyor, whereby the coffee particles adjacent the disc and the coffee particles adjacent the end of the conveyor will have relative movements and cause an interparticle rubbing action for reducing the chaff particles.

2. In apparatus of the character described having means for reducing coffee beans to a mass containing coffee particles and particles of liberated chaff, a cylindrical chamber for receiving the coffee mass at one end, a yieldable disk closing the other end of said chamber, a shaft extending longitudinally of the chamber and rotatably mounted at the chamber axis, a plurality of staggered pins carried by said shaft for agitating and beating the received coffee mass to initially comminute the chaff and advance the coffee mass towards said other end of the chamber, a relatively short screw conveyor carried by said shaft adjacent said other end for moving the coffee mass at this end generally longitudinally of the chamber against the disk, the end of the conveyor adjacent the disk being normally spaced from the disk a distance sufficiently to prevent further grinding of the coffee particles and acting to impart movement of the end portion of the coffee mass in a direction circumferentially of the chamber, and a roughened surface on said disk facing said screw conveyor for retarding circumferential movement of the mass pressing thereagainst, whereby the coffee particles adjacent the disk and the coffee particles adjacent the associated end of the conveyor will have relative movement and cause an inter-particle rubbing action for finally reducing the chaff particles.

WILLIAM M. WILLIAMS.
EUGENE G. BERRY.